2,993,033
FLAME-RESISTANT METHYL METHACRYLATE COPOLYMERS

Joseph L. O'Brien, Elkins Park, Pa., assignor to Rohm & Haas Company, Philadelphia, Pa., a corporation of Delaware
No Drawing. Filed Dec. 11, 1958, Ser. No. 779,565
5 Claims. (Cl. 260—80.5)

This invention relates to multicomponent copolymers which are highly resistant to burning. More particularly it concerns copolymers containing methyl methacrylate in preponderance which, in addition to being flame-resistant, are clear and hard, and have high heat distortion temperatures. The process for preparing these copolymers also constitutes a part of this invention.

This application is a continuation-in-part of my application Serial No. 649,318, filed March 29, 1957, now abandoned.

The new copolymers of present concern are formed from components (a), (b) and (c), as follows:

(a) Methyl methacrylate or a monomeric mixture containing at least 85% by weight of methyl methacrylate, the remainder of the mixture being a compound of the formula

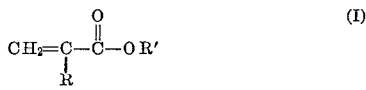

wherein R is a hydrogen atom or a methyl group and R' is an alkyl group of one to four carbon atoms when R is a hydrogen atom and of two to four carbon atoms when R is a methyl group;

(b) A compound of the formula

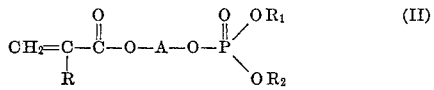

wherein R is a hydrogen atom or a methyl group, A is an alkylene group of two to three carbon atoms, and $R_1$ and $R_2$ each represent an alkyl group having one to two carbon atoms; and (c) A compound of the formula

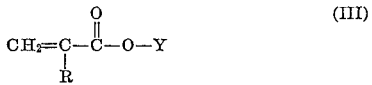

wherein R is a hydrogen atom or a methyl group and Y is a hydrogen atom or a substituted alkyl group of the formula

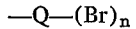

where Q is an alkyl group of two to three carbon atoms and n is an integer of one to two.

Typical compounds of Formula I above are methyl acrylate, ethyl acrylate and methacrylate, butyl acrylate and methacrylate, and the like. Such compounds are well known in the art.

Typical compounds of Formula II above are dimethylphosphatoethyl acrylate and methacrylate, diethylphosphatoethyl acrylate and methacrylate, dimethylphosphatopropyl acrylate and methacrylate, and diethylphosphatopropyl acrylate and methacrylate. These compounds are prepared by reacting, under controlled temperature conditions, an hydroxyalkyl ester of acrylic or methacrylic acid with an appropriate derivative of phosphoric acid, such as a tertiary ester of phosphoric acid, i.e., a trialkyl phosphate, or a diester halide of phosphoric acid, i.e., a dialkyl halophosphate.

Typical compounds of Formula III above are acrylic and methacrylic acid, bromoethyl acrylate and methacrylate, bromopropyl acrylate and methacrylate, 1,3-dibromopropyl acrylate and methacrylate, 2,3-dibromopropyl acrylate and methacrylate, and the like. These compounds are well known in the art.

In preparing these new copolymers, there are used percentages by weight based on the total weight of the copolymer, of monomeric components (a), (b), and (c) within the ranges as follows:

(a) 60% to 75%,
(b) 20% to 30%, and
(c) 5% to 10%.

Such monomeric components in amounts within the range above indicated are copolymerized in the presence of a small amount of a free-radical polymerization initiator with the application of heat. Amounts of initiator of the order of .05 to .5 part by weight per 100 parts of monomeric mixture to be polymerized usually suffice.

To illustrate the invention more fully, the following examples are given wherein the parts specified are by weight:

Example 1

| | Parts |
|---|---|
| Methyl methacrylate | 15 |
| Diethylphosphatoethyl methacrylate | 4 |
| Bromoethyl methacrylate | 1 |
| Azoisobutyronitrile (initiator) | 0.02 |

The above ingredients were mixed well and charged to a glass container which was then immersed in an oil bath held at 60° C. for 48 hours. Thereafter the container was removed from the oil bath. The resulting copolymer was a clear, colorless plastic having a Barcol hardness value of 31. It was found to be self-extinguishing, according to A.S.T.M. Method D635–44.

Example 2

| | Parts |
|---|---|
| Methyl methacrylate | 14 |
| Diethylphosphatoethyl methacrylate | 4 |
| Bromoethyl methacrylate | 2 |
| Azoisobutyronitrile (initiator) | 0.02 |

The same procedure was followed as described under Example 1. The resulting copolymer had a Barcol hardness value of 32 and was found to be self-extinguishing when subjected to the A.S.T.M. Method aforesaid.

Example 3

| | Parts |
|---|---|
| Methyl methacrylate | 15 |
| Diethylphosphatoethyl methacrylate | 4 |
| 1,3-dibromopropyl methacrylate | 1 |
| Azoisobutyronitrile (initiator) | 0.02 |

The procedure set forth in Example 1 was followed. The resulting copolymer was found to be self-extinguishing when subjected to A.S.T.M. Method D635–44.

Example 4

| | Parts |
|---|---|
| Methyl methacrylate | 14 |
| Diethylphosphatopropyl methacrylate | 4 |
| Bromoethyl methacrylate | 2 |
| Azoisobutyronitrile (initiator) | 0.02 |

There was followed the same procedure set forth in Example 1. The resulting copolymer was found to be self-extinguishing when subjected to the A.S.T.M. Method above referred to.

Example 5

| | Parts |
|---|---|
| Methyl methacrylate | 12 |
| Diethylphosphatoethyl methacrylate | 6 |
| 2,3-dibromopropyl methacrylate | 2 |
| Azoisobutyronitrile (initiator) | 0.02 |

The same procedure as in the preceding examples was followed. The resulting copolymer was found to be self-extinguishing when subjected to the aforesaid A.S.T.M. Method.

Example 6

| | Parts |
|---|---|
| Methyl methacrylate | 13 |
| Ethyl acrylate | 1 |
| Diethylphosphatoethyl methacrylate | 4 |
| Bromoethyl methacrylate | 2 |
| Azoisobutyronitrile (initiator) | 0.02 |

The same procedure as in the preceding examples was followed. The resulting copolymer was found to be self-extinguishing when subjected to the aforesaid A.S.T.M. Method.

Example 7

| | Parts |
|---|---|
| Methyl methacrylate | 14 |
| Diethylphosphatoethyl methacrylate | 4 |
| Bromoethyl methacrylate | 1 |
| Methacrylic acid | 1 |
| Azoisobutyronitrile (initiator) | 0.02 |

The same procedure as in the preceding examples was followed. The resulting copolymer was found to be self-extinguishing when subjected to the aforesaid A.S.T.M. Method.

Example 8

| | Parts |
|---|---|
| Methyl methacrylate | 12 |
| Diethylphosphatoethyl acrylate | 6 |
| Methacrylic acid | 2 |
| Azoisobutyronitrile (initiator) | 0.01 |

The same procedure as in the preceding examples was followed. The resulting copolymer was found to be self-extinguishing when subjected to the aforesaid A.S.T.M. Method.

Example 9

| | Parts |
|---|---|
| Methyl methacrylate | 14 |
| Diethylphosphatoethyl methacrylate | 4 |
| Bromoethyl acrylate | 2 |
| Azoisobutyronitrile (initiator) | 0.01 |

The same procedure as in the preceding examples was followed. The resulting copolymer was found to be self-extinguishing when subjected to the aforesaid A.S.T.M. Method.

Example 10

| | Parts |
|---|---|
| Methyl methacrylate | 129.5 |
| Diethylphosphatoethyl methacrylate | 37.0 |
| Bromoethyl methacrylate | 18.5 |
| Azoisobutyronitrile (initiator) | 0.185 |
| Linseed oil fatty acids (peak suppressant) | 0.095 |
| Aerosol OT (mold release agent) | 0.095 |

The above ingredients were mixed well, stirred and heated to 75° C. for a few minutes and then charged to a plate glass mold which had been preheated to 60° C. The filled mold was placed in a circulating hot-air oven and held at 60° C. for about 20 hours, when a standard polymerization heating cycle (60–110° C.) was begun. On completion of the heating cycle, the mold was removed from the oven and the resultant copolymer sheet was easily separated from the mold. In this manner a clear, colorless plastic sheet of approximately 0.25 inch thickness was obtained.

Standard specimen bars (0.25" x 0.5" x 5") cut from the above sheet were found to have a heat distortion temperature of 74° C. With a carefully adjusted Barcol hardness tester under precise conditions, a Barcol hardness value of 43 was obtained. Samples of this copolymer sheet showed a gain in weight of only 1.2% on soaking in water for a period of seven days at 25° C. Results of burning tests on the standard specimen bars (0.25" x 0.5" x 5") are given below:

1st ignition (30 seconds)—Self-extinguishing after 2 secs.
2nd ignition (30 seconds)—Self-extinguishing after 10 secs.
3rd ignition (30 seconds)—Self-extinguishing after 3 secs.
4th ignition (30 seconds)—Self-extinguishing after 8 secs.
5th ignition (30 seconds)—Self-extinguishing after 3 secs.

Example 11

| | Parts |
|---|---|
| Methyl methacrylate | 111.0 |
| Diethylphosphatoethyl methacrylate | 55.5 |
| Methacrylic acid | 18.5 |
| Azoisobutyronitrile (initiator) | 0.185 |
| Linseed oil fatty acids (peak suppressant) | 0.095 |
| Aerosol OT (mold release agent) | 0.095 |

The same procedure was followed as described under Example 10. In this manner, a clear, colorless plastic sheet of approximately 0.25 inch thickness was obtained.

Standard specimen bars (0.25" x 0.5" x 5") cut from the above sheet were found to have a heat distortion temperature of 86° C. With a carefully adjusted Barcol hardness tester under precise conditions, a Barcol hardness value of 47 was obtained. Samples of this copolymer sheet showed a gain in weight of only 2.6% on soaking in water for a period of seven days at 25° C. Results of burning tests on the standard specimen bars (0.25" x 0.5" x 5") are given below:

1st ignition (30 seconds)—Self-extinguishing after 1 sec.
2nd ignition (30 seconds)—Self-extinguishing after 2 secs.
3rd ignition (30 seconds)—Self-extinguishing after 2 secs.
4th ignition (30 seconds)—Self-extinguishing after 2 secs.
5th ignition (30 seconds)—Self-extinguishing after 2 secs.

When a copolymer of 80% by weight of methyl methacrylate and 20% by weight of diethylphosphatoethyl methacrylate was tested by the A.S.T.M. Method above referred to, it was found that such copolymer continued burning after the second ignition. It was, therefore, not self-extinguishing. Also, copolymers of 90% by weight of methyl methacrylate and 10% by weight of bromoethyl methacrylate or of 90% by weight of methyl methacrylate and 10% by weight of methacrylic acid burned readily on the first ignition and continued to burn at a rate of approximately ½ inch per minute. The burning rate last mentioned is characteristic of methyl methacrylate itself. Thus, by reason of the self-extinguishing characteristics of the copolymers within the scope of this invention, it is evident that an advance in the art has been attained.

The new copolymers have a combination of desirable properties that particularly adapt them to a wide variety of uses. They have outstanding utility as flame-resistant plastics for architectural applications, such as partitions, luminous ceilings, lighting fixtures, skylights, window glazing, signs, and the like. They also are useful in producing flame-retardant coatings and for many other purposes which will be readily apparent to those skilled in the art.

What I claim is:

1. A self-extinguishing, flame-resistant, three-component copolymer of a member from each of the groups as follows:

(a) methyl methacrylate and mixtures of at least

85% by weight of methyl methacrylate with up to 15% by weight of a compound of the formula

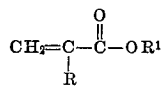

wherein R is a member of the group consisting of a hydrogen atom and a methyl group and $R^1$ is an alkyl group of one to four carbon atoms when R is a hydrogen atom and of two to four carbon atoms when R is a methyl group, (b) a compound of the formula

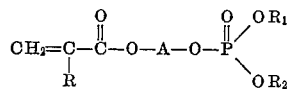

wherein R is a member of the group consisting of a hydrogen atom and a methyl group, A is an alkylene group having two to three carbon atoms, and $R_1$ and $R_2$ are each an alkyl group having one to two carbon atoms, and (c) a compound of the formula

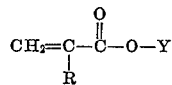

wherein R is a member of the group consisting of a hydrogen atom and a methyl group and Y is a member of the group consisting of a hydrogen atom and a substituted alkyl group having the formula

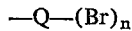

where Q is an alkyl group of two to three carbon atoms and $n$ is an integer of one to two, in percentages by weight of the copolymer within the ranges as follows:

(a) 60% to 75%,
(b) 20% to 30%, and
(c) 5% to 10%.

2. A self-extinguishing, flame-resistant, three-component copolymer of methyl methacrylate, diethylphosphatoethyl methacrylate, and methacrylic acid, in percentages by weight of the copolymer within the ranges as follows: 60% to 75%, 20% to 30%, and 5% to 10%, respectively.

3. A self-extinguishing, flame-resistant, three-component copolymer of methyl methacrylate, diethylphosphatoethyl methacrylate, and bromoethyl methacrylate, in percentages by weight of the copolymer within the ranges as follows: 60% to 75%, 20% to 30%, and 5% to 10%, respectively.

4. A self-extinguishing, flame-resistant, three-component copolymer of methyl methacrylate, diethylphosin the ranges as follows: 60% to 75%, 20% to 30%, phatoethyl methacrylate, and 2,3-dibromopropyl methacrylate, in percentages by weight of the copolymer withand 5% to 10%, respectively.

5. A self-extinguishing, flame-resistant, three-component copolymer of methyl methacrylate, dimethylphosphatoethyl methacrylate, and bromoethyl methacrylate, in percentages by weight of the copolymer within the ranges as follows: 60% to 75%, 20% to 30%, and 5% to 10%, respectively.

References Cited in the file of this patent

UNITED STATES PATENTS 2,791,574     Lanham _____ May 7, 1957

UNITED STATES PATENT OFFICE
CERTIFICATE OF CORRECTION

Patent No. 2,993,033                                   July 18, 1961

Joseph L. O'Brien

It is hereby certified that error appears in the above numbered patent requiring correction and that the said Letters Patent should read as corrected below.

Column 6, line 21, strike out "in the ranges as follows: 60% to 75%, 20% to 30%," and insert the same after "with-" in line 23, same column.

Signed and sealed this 21st day of November 1961.

(SEAL)
Attest:

ERNEST W. SWIDER                                        DAVID L. LADD
Attesting Officer                                           Commissioner of Patents